United States Patent Office 3,028,650
Patented Apr. 10, 1962

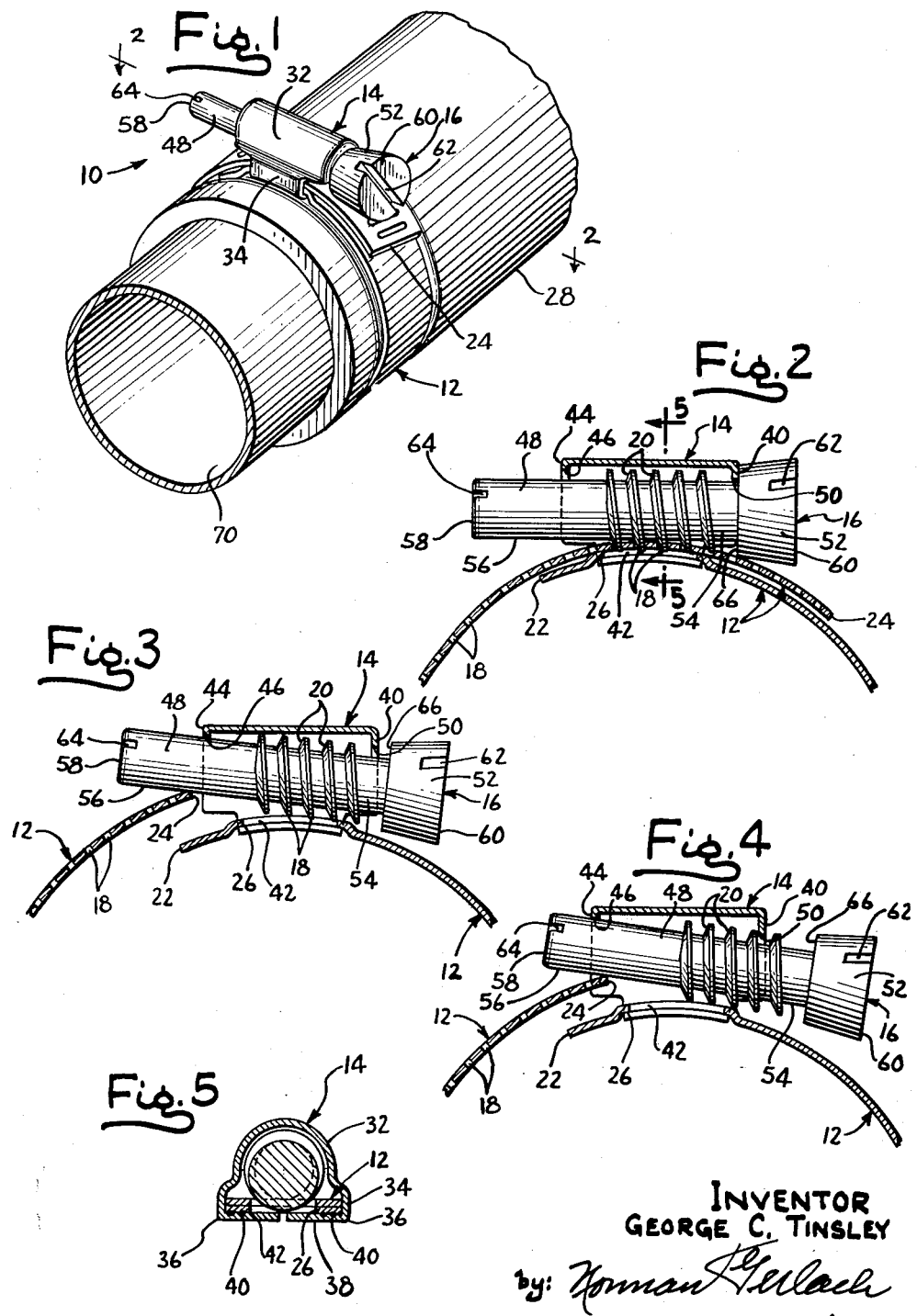

3,028,650
WORM DRIVE HOSE CLAMP
George C. Tinsley, Hinsdale, Ill., assignor to Du Page Stamping & Manufacturing Co., Downers Grove, Ill., a corporation of Illinois
Filed Dec. 10, 1959, Ser. No. 858,651
1 Claim. (Cl. 24—274)

The present invention relates to hose clamps of the type commonly employed in the automotive industry for the coupling of hose connections to radiators, engine blocks, power steering and power brake apparatus, water pumps and the like. The invention is particularly concerned with a type of hose clamp wherein the opposite ends of a flexible clamping band or strap are adapted to be acted upon by a freely rotatable operating worm or screw in such a manner that the band may be constricted about a hose connection and centripetal force thus applied to the hose connection to retain the latter in coextensive sealing engagement with a cylindrical pipe or flange to establish a fluid-tight connection thereto. While the improved hose clamp of the present invention has been designed primarily for use in connection with such automotive use, the invention may, if desired, be employed in other fields, as for example a clamp for tubular hose employed in conducting compressed air, gasoline or other fluids in aircraft, as a piston ring compressor, or for securing the ends of flexible tubular conduits to large diameter attachment flanges in sand blasting or sand scrubbing foundry equipment. Irrespective however of the particular use to which the present invention may be put, the essential features thereof are at all times preserved.

Extensive use has been made of so-called worm drive hose clamps of the character briefly outlined above. They are inexpensive to manufacture, and because of their wide range of adjustment they are useable in connection with both small and large diameter hose connections. Under favorable circumstances, they are easy to apply and remove. However, under unfavorable circumstances considerable difficulty may be encountered in their application, this being the case particularly in connection with hose clamps having short bands or straps and designed for small diameter hose connections.

One specific type of worm drive hose clamp which has found favor on the market is exemplified in United States Tetzlaff Patent No. 2,452,806, granted on November 2, 1948 and entitled, "Clamp." The clamp shown and described in such patent is comprised of but three coacting elements including a structurally rigid box-like housing, a clamping band and a worm. The rigid housing is secured to the band near one end thereof and receives the other end region of the band slidably therein. The worm is rotatably mounted within the box-like housing and has one end thereof projecting from the housing for worm manipulating purposes. The worm threads on the worm are engageable with a series of teeth which extend inwardly from the sliding end of the band and by rotation of the worm in one direction or the other, the free end region of the band is slid through the housing to either constrict or expand the band.

Worm drive hose clamps of this character are possessed of two limitations, one of which resides in the fact that the worm is capable of being manipulated only at one end thereof. Thus, when working in close quarters, as for example where an attachment flange for the hose coupling is set within a recess, or where there is an adjacent projection, the clamp assembly must be applied to the hose in one wrap-around direction and not in the other so that the manipulating end of the worm (which is usually slotted for reception of a screw driver or similar tool) will be accessible on the side of the clamp remote from the projection. Ultimate assembly of the hose clamp on the hose is thus sometimes accomplished only after repeated trial and error methods.

The other limitation associated with this type of worm drive hose clamp resides in the fact that in order to apply the clamp to a hose connection, the ends of which have already been applied to the attachment flanges of the parts to be coupled, it is necessary to unwind the band, so to speak, completely and, after passing the band loosely around the hose connection, the extreme free end of the band must be threaded through the entrance opening provided for it in the structurally rigid housing. This necessitates aligning the extreme end of the band axially with the housing before the worm can be made to make the necessary purchase on the threads of the band. Where small diameter hose connections and short clamping bands are concerned such an operation is difficult due to the fact that although the band is flexible over its entire length, small increments of band length are not flexible and thus abnormal band flexing must be resorted to to gain initial entry of the end of the band into the housing. The situation is aggravated by virtue of the fact that the worm is more or less fixedly held in its axial position of rotation within the housing and is also held against axial shifting relative to the housing so that it cannot be removed from the housing, even when the free end of the band is withdrawn therefrom. Thus, the size of the available opening at the entrance end of the housing is not large so that with small length clamping bands the difficulty of initially threading the free end of the band into the housing so that it will extend between the worm threads and the fixed end of the band often leads to removal of the applied hose connection and application of the clamp thereto after it has been manipulated in its free state to close the ends of the band.

The present invention is designed to overcome the above-noted limitation that is attendant upon the construction and use of currently employed worm drive hose clamps, and toward this end, it contemplates the provision of a clamp which, when the free end of the clamping band is threaded through the housing, will maintain the driving worm in close intimate operating engagement with the threads on the clamping band and which, when the free end of the band is withdrawn from the housing, will release the worm so that the latter may be tilted through a slight angle and also, if necessary, unthreaded, or partially unthreaded, from the housing so as to afford a wide opening at the entrance end of the housing into which the free end of the clamping band may readily find entrance, after which the worm may be reapplied to the housing in such a manner that it will operatively engage the threads of the clamping band. Still further, according to the invention, the distal end of the worm is made smooth and truly cylindrical and is caused to project beyond the end of the housing for an appreciable distance so that it will afford an uninterrupted smooth guiding surface designed for sliding or camming engagement with the extreme free end of the clamping band whereby the latter end of the band will be guided into the entrance opening of the housing. By such an arrangement, there is no necessity for bending the free end region of the band so as to align it with the entrance opening of the housing when the clamp is applied to a hose connection which has previously been telescopically applied to both attachment flanges or fittings on the two parts to be coupled.

The provision of a worm drive hose clamp of the character briefly outlined above being among the principal objects of the invention, numerous other objects and advantages, not at this time enumerated, will become apparent as the following description ensues.

In the accompanying single sheet of drawings forming a part of this specification one illustrative embodiment of the invention has been shown.

In these drawings:

FIG. 1 is a fragmentary perspective view showing a worm drive hose clamp constructed in accordance with the principles of the present invention in operative position on a hose connection;

FIG. 2 is a sectional view taken substantially along the vertical plane indicated by the line 2—2 of FIG. 1 in the direction of the arrows;

FIG. 3 is a sectional view similar to FIG. 2 showing the clamping band unthreaded from the worm-retaining housing and in a position preparatory to introduction thereof into the housing;

FIG. 4 is a sectional view similar to FIG. 3 showing the worm partially unthreaded from the housing; and FIG. 5 is a sectional view taken substantially along the line 5—5 of FIG. 2.

Referring now to the drawings in detail, a clamp assembly constructed according to the present invention has been designated in its entirety at 10 and involves in its general organization three component parts, namely a clamping band 12, a box-like housing 14 and a worm 16. The band 12 is in the form of an elongated flexible strip of resilient sheet metal stock, preferably steel, of uniform width. The band is formed with a plurality of equally spaced perforations or openings 18 which are cut therein at such an angle as to cooperate with the thread 20 of the band tightening worm 16. These spaced openings extend from one end of the band 12 a sufficient distance longitudinally of the band so that the latter may be employed in connection with hose of varying diameter although it is preferable that the band be of a length for a predetermined diameter hose. For purposes of description herein, one end 22 of the band 12 may be regarded as being the fixed end while the other end 24 thereof may be considered to be slidable relative to the fixed end 22.

The fixed end region of the band 12 is crimped so as to form a slightly offset portion 26 providing a seat which is arcuate in configuration to conform to the curvature of the outside cylindrical surface of a hose such as the hose 28 to which the band is shown as being applied in FIG. 1. Portions of the housing 14 are spot welded to this offset seat portion 26 in a manner and for a purpose that will be made clear presently.

The housing 14 is of unitary rigid box-like construction and it is preferably in the form of a sheet metal stamping which, in its finished form includes a generally semi-cylindrical top wall or crown portion 32 having outwardly offset lower side wall portions 34, the lower edges 36 of which are turned inwardly as at 38 to provide a pair of inwardly extending flanges which are spot welded as at 40 to the underneath or outer side of the offset seat portion 26 as best seen in FIG. 4.

It is to be noted at this point that the offsetting of the seat portion is resorted to specifically so that the portions of the band 12 which are adjacent this offset portion 26 will lie in the same arcuate plane as that of the flange 38 and thereby afford a more complete or substantially continuous engagement between the band and the hose connection 28 to which the band may be applied.

The rigid housing 14 is formed with one end wall 40 which is in the form of a downtourned flange of limited arcuate extent, this flange, in effect, constituting a single thread designed for cooperation with the threads 20 on the worm 16, under circumstances which will be made clear subsequently, so that the worm 16, which normally is maintained coaxial with the elongated box-like housing, may be unthreaded from the housing for removal purposes.

The offset seat portion 26 is formed with a central opening 42 therethrough so that the threads 20 of the worm 16 will not interfere with the fixed end region of the band 12 when the band is turned in either direction to impel the slidable end region of the band axially through the housing 14 in one direction or the other.

The housing 14 is formed with a second downturned flange or rigidifying rib 44 at the end of the housing remote from the end wall or flange 40, this latter flange being of shorter extent than that of the flange 40.

As best seen in FIGS. 2 and 3, the latter flange 44 affords a relatively wide entrance opening or mouth 46 through which the shank portion 48 of the worm 16 projects and into which the slidable end 24 of the clamping band 12 may be threaded, so to speak, during initial assembly of the clamp or during application of the clamp to the hose 28. The flanged end of the housing affords a restricted opening 50 through which the shank portion 48 of the worm 16 also projects.

The threads 20 are of limited extent and they terminate short of the enlarged head portion 52 of the worm 16 so as to provide, in effect, a clearance region 54 for the flange or end wall 40. These threads 20 also terminate remote from the distal end of the worm 16, thus providing a smooth uninterrupted cylindrical extent 56 between the extreme distal end 58 of the worm and the threads 20. The head portion 52 has an end face 60 which is slotted as at 62 diametrically across the head to accommodate reception of one end of a tool such as a screw driver by means of which the worm 16 as a whole may be turned in either direction. The distal end face 58 of the worm shank portion 48 is similarly slotted as at 64 for similar purposes.

It is to be noted that when the slidable end region of the clamping band 12 projects through the housing 14 and the threads 20 are in operative register and engagement with the threads afforded by the openings 18 in the band as shown in FIG. 2, the inner rim of the downturned flange 40 engages the cylindrical surface of the clearance region 54 while the threads 20 are forced against the walls of the various openings 18 so that the axis of the worm 16 becomes fixed and is coaxial with the axis of the housing 14 so that there will be no lateral shifting of the worm relative to the housing. The worm is thus rigid within the housing except for the rotational movement of which it is capable and for a limited amount of axial shifting movement within the housing. This axial shifting movement is limited in one direction by engagement of the downturned end wall or flange 40 with the rearwardly facing shoulder 66 afforded by the head 52 of the worm 16, and is limited in the other direction by engagement of the wall 40 with the end of the threaded region 20 of the worm.

In the actual use of the clamp assembly 10, the band is placed about the hose 28 so as to encircle the latter and the end 24 thereof is fed through the open mouth 46 and between the offset seat portion 26 of the band and the worm 16 so that the worm threads 20 engage the walls of the openings 18. Utilizing either the slot 62 or the slot 64, the worm 16 may be turned in such a direction as to feed the slidable end region of the clamping band 12 through the housing 14 to constrict the band in the hose, the slidable end region of the band moving to the right as viewed in FIG. 2. When the band has been thus tightened to the desired extent, the turning operation will be terminated and the worm will effect a self-locking against the threads of the band by virtue of the small pitch angle of the threads 20. Interengagement between the shoulder and the end wall or flange 40 will effect the necessary axial reaction force against the worm so that the worm will perform its required band-driving function.

Loosening of the clamping 12 from the hose connection 28 may be effected by turning the worm in the other direction, utilizing either slot 62 or 64 for turning purposes. If the hose connection, due to long contact in situ with the hose nipple or flange 70, has become bonded to the latter, and if the band 12 has become bonded to the hose connection 28 for similar reasons, engagement between the wall 40 and the end of the treaded region 20 of the worm 16 will afford the necessary reaction force for positive movement of the band end 24 to the left as viewed in FIG. 2 to break one or both bonds and loosen the clamp from the hose connection.

It will be understood that assembly of the clamp on a given hose connection 28 may be effected by first feeding the sliding end 24 of the band 12 into the open mouth 46 of the fixed housing 14 so as to produce a closed loop which may be initially telescopically positioned over one end of the hose connection prior to attachment of the hose connection 28 to the flange 70. However, if both ends of the hose connection 28 have already been applied to their respective attachment flanges or nipples and it is desired to apply the hose clamp to the hose connection without removing either end of the latter, the band 12 will be opened so that it may be passed around the hose connection and the end 24 thereof subsequently fed into the open mouth 46 of the housing 14 with the smooth cylindrical portion 56 of the shank 48 serving as a guide to direct the extreme end of the band 12 into the entrance opening. Contact of the free end of the band 12 with this smooth cylindrical surface 56 of the worm shank will cause the worm to assume the inclined position wherein it is illustrated in FIG. 3, thus widening the entrance opening for a more facile entry of the band into the housing.

In the case of extremely small diameter hose connecttion 28 and of correspondingly short clamping bands 12, this feeding operation may be simplified by moving the worm 16 to the dotted line inclined position wherein it is illustrated in FIG. 3 and thereafter backing off the worm to a slight degree so that the clearance between the shank 48 of the worm and the offset seat 42 is increased to allow a more facile entrance of the band end 24 into the mouth 46. Such backing off of the screw may be conducted only partially or it may be conducted to completion wherein the worm is removed from the housing 14.

Such backing off or removal of the worm is made possible only when the sliding end region 24 of the band has been completely unthreaded from the worm 16 because it is at this time, and at this time only, that the necessary clearance is afforded for dropping of the right hand end of the worm so that the end wall 40 may enter between the adjacent threads 20 of the worm 16, slide along the smooth cylindrical surface of the shank 48 and effect threaded engagement with the latter. When the sliding end region 24 of the band 12 is in position within the housing 14, no such clearance exists and the cylindrical region 54 of the worm 16 is maintained firmly against the rim 50 of the end wall or flange 40 so that the end wall may not enter between adjacent threads.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claim is the same to be limited.

Having thus described the invention what I claim as new and desire to secure by Letters Patent is:

A hose clamp assembly comprising in combination an elongated clamping band of flexible strong sheet metal for encircling a hose and having a series of spaced openings therethrough defining a series of teeth, a rigid open-ended box-like housing having a curved top wall, spaced side walls, and a bottom wall, one end of said housing being formed with an inturned flange defining a forwardly facing shoulder and a rearwardly facing shoulder respectively, one end region of the band projecting endwise into the housing through said one end thereof and being fixedly secured to the housing bottom wall, the other end region of the band projecting normally in reentrant fashion into the housing through the other end of the latter in overlapping relation to the fixed end region of the band and being slidable lengthwise through the housing, a band-tightening worm projecting lengthwise through the housing and having its opposite ends extending outwardly of the housing, said worm having a screw-threaded portion intermediate its ends and in the space within the housing between said top wall and the slidable portion of the band and engageable with said series of teeth on the band, said worm being formed with an enlarged head on one end thereof exteriorly of the housing and defining a rearwardly facing shoulder engageable with the forwardly facing shoulder on the inturned flange of the housing to limit the extent of axial shifting of the worm when the latter is turned in a direction to tighten the band, the top wall of said housing comprising a seat for the screw-threaded portion of the worm when the latter portion of the worm is in engagement with said teeth on the band, said inturned flange of the housing being engageable with the extreme forward end of the screw-threaded portion of the worm to limit the extent of axial shifting of the worm when the latter is turned in a direction to loosen the band, the end region of the worm remote from said head projecting beyond the adjacent end of the housing a distance greater than the diameter of the worm at such end region and presenting exteriorly of the housing a smooth unbroken cylindrical surface designed for camming engagement with the free end of the band for guiding the latter into said housing during installation of the hose clamp assembly, the thickness of the band and the height of said inturned flange being such that when said other end region of the band is unthreaded from the screw-threaded portion of the worm, the extreme end of the screw-threaded portion of the worm will clear said inturned flange of the housing and permit the inturned flange to enter between adjacent threads of the screw-threaded portion of the worm so that the worm may be unthreaded from the housing.

References Cited in the file of this patent
UNITED STATES PATENTS
2,767,455 Schaefer _____ Oct. 23, 1956
FOREIGN PATENTS
217,111 Switzerland _____ Jan. 16, 1942